Patented Jan. 13, 1953

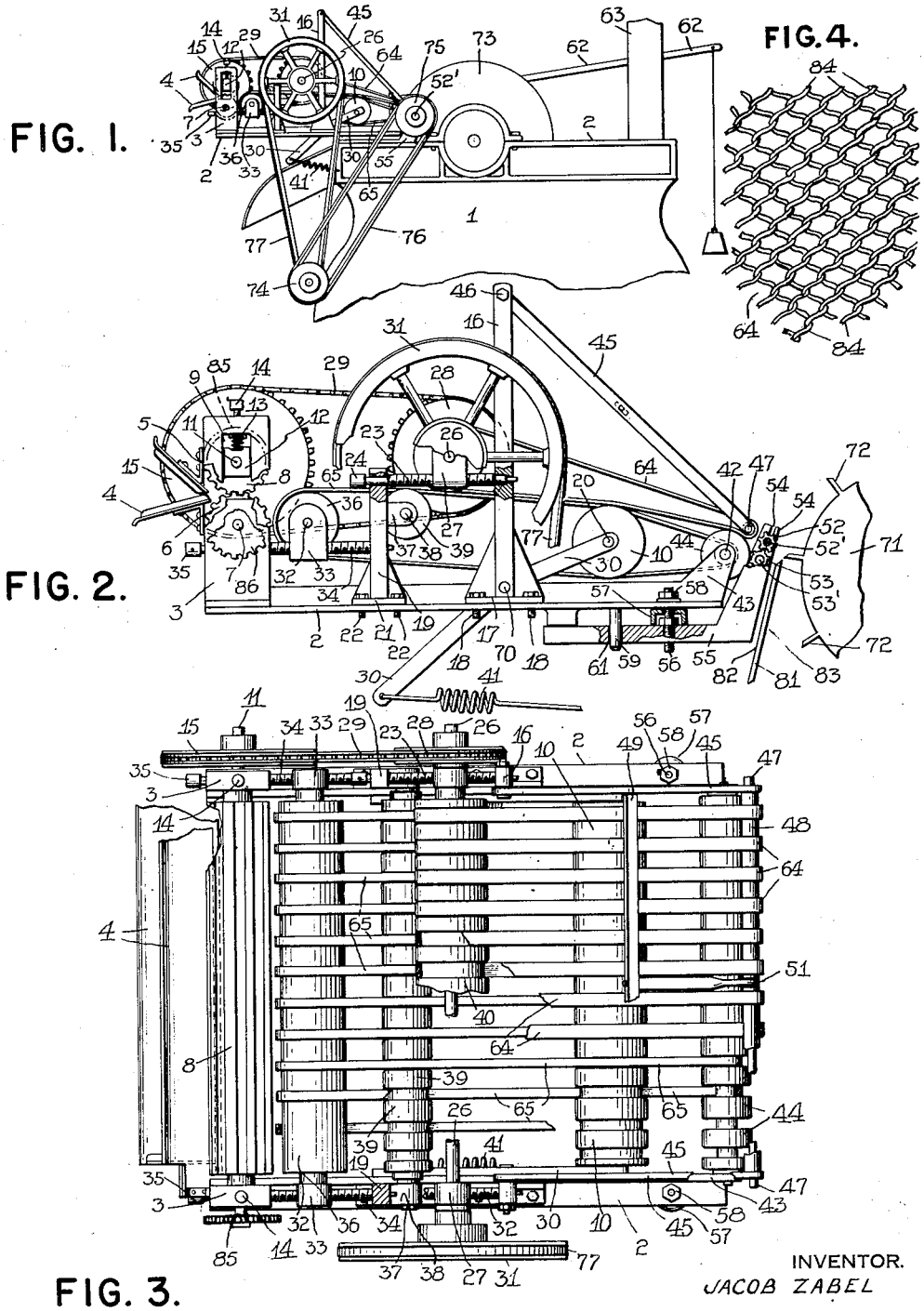

2,624,917

UNITED STATES PATENT OFFICE 2,624,917

FEEDING ATTACHMENT FOR FUR CUTTING MACHINES

Jacob Zabel, Newark, N. J.

Application September 8, 1947, Serial No. 772,826

2 Claims. (Cl. 19—2)

This invention relates to a machine for defleecing animal skins, and to a process for defleecing such skins.

Heretofore, it has been proposed to defleece animal skins in different ways. One proposed method was to pass the skin to be defleeced over an endless belt, and then to a defleecing cutter, such as one of the rotary type. Such a method and machine had the serious disadvantage that the entire method required manual operation, which involved the grave danger of risk to the operator's fingers, hands, and arms.

I have discovered a novel machine and method of defleecing animal skins which eliminates this grave danger of risk. According to this invention, the skin to be defleeced is fed to a hopper, then to a pair of meshed fluted rollers, and from the fluted rollers to an endless belt, and preferably between a plurality of endless belts, at least one of which has end rollers and a plurality of intermediate rollers for shaping the skin prior to defleecing. The skin, in contact with the upper surface of the lower belt and the lower surface of the upper belt is then fed thru a pair of meshed fluted rollers, the lower roller of which is in contact with the lower end roller of the endless belt, to a defleecing cutter, preferably of the rotary type. The cutter slices off a thin layer of pelt, thereby defleecing the skin. The fleece drops into a fleece chute and the defleeced skin into a pelt chute.

To ensure complete removal of the fleece from the skin, I provide a small upper roller which, with its belt, is held in contact over the end roller adjacent to the defleecing cutter.

I have also discovered that if one or more of the endless belts are in the form of a mesh belt, the defleecing operation can be carried out more easily and efficiently.

In defleecing according to my invention, only the first step of feeding the skin to the hopper is carried out manually, all other steps being carried out automatically, thereby eliminating the danger of risk to the body of the operator, as stated above.

Accordingly, it is an object of the present invention to provide a machine for easily and efficiently defleecing an animal skin.

Another object of the invention is to provide a machine for defleecing an animal skin without danger of risk to the body of the operator.

Another object is to provide a machine which is substantially automatic in operation.

Still another object is to provide a new and novel method of defleecing an animal skin.

Referring now to the drawings,

Fig. 1 is a side elevational view of a machine according to the present invention, Fig. 2 is an enlarged fragmentary view, partly in section, of the left side of Fig. 1, Fig. 3 is an enlarged plan view of the left side of Fig. 1 and, Fig. 4 is a view of the mesh endless belts.

1 is a base, upon which rests angle supports 2. Vertical supports 3 carry a hopper 4 secured thereto by means of brackets 5. A lower fluted roller 6 is rotatably mounted in the center of supports 3 by shaft 7. An upper fluted roller 8 meshes with lower fluted roller 6, and is rotatably and vertically movable in slots 9 of supports 3 by means of shaft 11, carried by guide blocks 12, which are vertically adjustable by springs 13 and screws 14.

One end of the shaft 11 carries a sprocket 15. Vertical supports 16 are carried by angle plates 17, the horizontal portions of which are screwed to the horizontal plates of angle supports 2 by screws 18. Vertical supports 19 are also carried by angle plates 21, which are screwed to the horizontal plates of angle supports 2 by screws 22. Vertical supports 16 and 19 carry screws 23 having heads 24.

A shaft 26 is rotatably mounted in collars 27, through the lower parts of which are provided holes through which screws 23 pass for supporting the collars 27 and shaft 26 intermediate of supports 16 and 19. A sprocket 28 is carried by the end of shaft 26 on the same side of the machine as sprocket 15, and is connected thereto by chain belt 29. The other end of the shaft 26 carries a pulley wheel 31.

A shaft 32 is journalled in collars 33, through the lower ends of which pass screws 34 having heads 35, the screws 34 supporting the shaft 32 intermediate of supports 3 and 19. The shaft 32 carries a roller 36. Vertical supports 19 carry members 37 in which are journalled a shaft 38 carrying a pulley wheel 39. The shaft 26 also carries a pulley wheel 40. Shaft 26, sprocket 28, pulley wheel 31 and pulley wheel 40 are horizontally movable by adjustment of the heads 24 of screw 23, and shaft 32 and roller 36 are horizontally movable by adjustment of heads 35 of screws 34.

A pulley wheel 10 is carried by rotatable shaft 20 which is journalled at one end of angle levers 30. Levers 30 are pivoted at 70 to vertical supports 16. The other ends of the levers are connected through springs 41 to the base 1, for determining the position of the pulley wheel 10.

A rotatable shaft 42 is journalled in arms 43 of angle supports 2, and carries an end roller 44. Spring arms 45 are pivoted at 46 to support 16, and a rotatable shaft 47 carrying an upper roller 48 is journalled at the free ends of the arms 45. Intermediate of the pivoted ends and the free ends of arms 45 is a crossbar 49, which carries a finger 51 pressing against the upper roller 48 for causing the same to contact the lower roller 44.

An upper fluted roller 52 mounted on shaft 52' meshes with a lower fluted roller 53 mounted on shaft 53' in a slot 54 of angle bracket 55. Lower fluted wheel 53 is in contact with lower end roller 44. The angle bracket 55 is secured to the under side of the horizontal plate of angle support 2 by means of threaded bolt 56, channel member 57 and nuts 58. The lower side of the angle bracket 2 also carries a stud 59 which passes through an opening 61 in angle bracket 55. The fluted rollers 52 and 53 are held in mesh position by means of a weighted arm 62 which is pivoted at its inner end to a fixed part of the machine and guided against a support 63, all in the known manner.

Strips 64 form an endless belt with pulley wheel 40 and roller 48, and strips 65 form an endless belt with end roller 36 and end roller 44, and intermediate pulley wheels 39 and 10. The strips 64 and 65 are preferably in the form of a mesh, as for example, helical coils 84 intermeshed with each other as illustrated in Fig. 4, in which case the finger 51 is unnecessary.

A rotary deflecting cutter 71 having knives 72, and a casing 73, is connected to any suitable source of driving power (not shown).

74 is a pulley wheel which is also connected to a suitable source of driving power (not shown). The shaft 52' also carries a pulley wheel 75 which is connected to pulley wheel 74 by means of a belt 76. Pulley wheel 74 is also connected to pulley wheel 31 by means of a belt 77. It is thus obvious that pulley wheel 74 is the single driving means for the sprockets, fluted rollers, and the feeding means or endless belts, the lower endless belt 65 being driven by friction by the upper endless belt 64.

A partition 81 adjacent the defleecing cutter forms a fleece chute 82 and a pelt chute 83. An upper gear wheel 85 is carried by shaft 11, and drives a lower gear wheel 86 carried by shaft 7. The sprocket 28 and chain belt 29 drives sprocket 15 counterclockwise. Upper fluted roll 8 is consequently driven counterclockwise. Shaft 52' also carries an upper gear wheel (not shown) which meshes with a lower gear wheel (not shown) carried by shaft 53', so that fluted wheel 52 rotates counterclockwise and toothed wheel 53 rotates clockwise.

A skin, preferably first carroted to render it brittle and hard, is fed, hair downward, into the hopper 4. It passes through the fluted rollers 6 and 8, then between the endless belts 64 and 65 and then between the fluted rollers 52 and 53 to the defleecing cutter 71. The defleecing cutter 71 cuts off a thin slice of pelt, the fleece falling into the fleece chute 82 and the defleeced hide into the pelt chute 83. Thus, the operation of the machine is safe for the operator, because in the sole manual step of feeding, he is protected by the hopper, and all subsequent steps are automatic.

During this operation, the fluted roller 53 brushes against lower roller 44 and removes material which otherwise would gather in the flutes of roller 53, so that cleaning of the flutes of roller 53 is not necessary.

The machine according to the present invention speeds up production appreciably. In addition, the fluted rollers 6 and 8 straighten out the skins uniformly, and prepare them in proper form for the cutting equipment, thus eliminating substantially all irregularities in the skins. The machine can thus cut the skins properly, without chopping off pieces, which ordinarily would result in a large loss. Irregular skins must be torn to make them sufficiently uniform to be fed to the machine, but ordinarily the entire skin can be fed through the machine at one time.

If there are obstructions in the skin, such as a bone, nail, etc., they will not pass through fluted rollers 6 and 8. In such case the obstruction is removed or the skin is torn, so that the skin will then pass through rollers 6 and 8.

Torn skins or small skins can be defleeced with the machine, if a mesh endless belt is employed.

Modifications may be made in carrying out the present invention without departing from the spirit and scope thereof, and I am to be limited only by the appended claims.

In some instances where animal skins are to be defleeced and such skins are not subject to the usual hard and brittle condition referred to above, the fluted rollers 6 and 8 may be eliminated, in which case the skins are fed directly into the belts 64 and 65.

I claim:

1. A machine for defleecing animal skins, comprising a pair of meshed fluted rollers, a rotary defleecing cutter, upper and lower endless belts between said fluted rollers and said defleecing cutter, upper and lower end rollers for said belts adjacent said fluted rollers, upper and lower end rollers for said belts adjacent said defleecing cutter, upper and lower fluted rollers between the said latter end rollers of the said lower belt and said deficeecing cutter, the said latter end roller of the said latter lower belt being in contact with said latter fluted roller.

2. A machine for defleecing animal skins, comprising a pair of meshed fluted rollers, a rotary defleecing cutter, upper and lower mesh endless belts, between said fluted rollers and said defleecing cutter, upper and lower end rollers for said belts adjacent said fluted rollers, upper and lower end rollers for said belts adjacent said defleecing cutter, upper and lower fluted rollers between the said latter end rollers of the said lower belt and said deflectink cutter, the said latter end roller of the said latter lower belt being in contact with said latter fluted roller.

JACOB ZABEL.

REFERENCES CITED

The following references are of record in the file of this patent:

UNITED STATES PATENTS

| Number | Name | Date |
|---|---|---|
| 188,295 | Hollingsworth | Mar. 13, 1877 |
| 198,553 | Ball | Dec. 25, 1877 |
| 674,472 | Sackett | May 21, 1901 |
| 978,217 | Ryan | Dec. 13, 1910 |
| 1,783,693 | Bloch | Dec. 2, 1930 |
| 2,151,930 | Messing et al. | Mar. 28, 1939 |